United States Patent
Ciaramitaro

(10) Patent No.: US 9,228,296 B2
(45) Date of Patent: Jan. 5, 2016

(54) PRE-SEWN DISTRESSED APPLIQUE

(71) Applicant: Stahls' SCS, St. Clair Shores, MI (US)

(72) Inventor: Fred Ciaramitaro, Eastpointe, MI (US)

(73) Assignee: STAHLS' SCS, St. Clair Shores, MI (US)

( * ) Notice: Subject to any disclaimer, the term of this patent is extended or adjusted under 35 U.S.C. 154(b) by 157 days.

(21) Appl. No.: 14/024,392

(22) Filed: Sep. 11, 2013

(65) Prior Publication Data

US 2014/0072755 A1   Mar. 13, 2014

Related U.S. Application Data

(60) Provisional application No. 61/699,633, filed on Sep. 11, 2012.

(51) Int. Cl.
| | |
|---|---|
| *B32B 7/08* | (2006.01) |
| *B29C 65/00* | (2006.01) |
| *B32B 37/00* | (2006.01) |
| *B32B 38/04* | (2006.01) |
| *B32B 3/02* | (2006.01) |
| *B32B 3/06* | (2006.01) |
| *B32B 9/00* | (2006.01) |
| *B32B 23/02* | (2006.01) |
| *B32B 7/12* | (2006.01) |
| *B32B 15/04* | (2006.01) |
| *D06Q 1/08* | (2006.01) |
| *A41D 27/08* | (2006.01) |
| *D06Q 1/00* | (2006.01) |
| *B29C 65/48* | (2006.01) |
| *B29C 65/62* | (2006.01) |
| *B29C 65/72* | (2006.01) |

(52) U.S. Cl.
CPC *D06Q 1/08* (2013.01); *A41D 27/08* (2013.01); *D06Q 1/00* (2013.01); *B29C 65/48* (2013.01); *B29C 65/62* (2013.01); *B29C 65/72* (2013.01)

(58) Field of Classification Search
CPC ........... D06Q 1/00; D06Q 1/005; D06Q 1/12; A41D 27/08; B32B 7/12; B32B 2437/00; B32B 2451/00; B32B 5/024; B32B 27/12; B32B 37/00; B32B 37/02; B32B 37/025; B32B 37/12; D06M 17/04; B29C 65/00; B29C 65/48; B29C 65/4815; B29C 65/62; B29C 65/72; B29C 66/4724
USPC ........... 156/60, 63, 91, 92, 93, 153, 154, 250, 156/252, 256, 263, 266, 308.2, 309.6; 428/77, 78, 79, 98, 102, 192, 221, 343
See application file for complete search history.

(56) References Cited

U.S. PATENT DOCUMENTS 5,009,943 A * 4/1991 Stahl ...................... B32B 27/12
156/263

(Continued)

*Primary Examiner* — Philip Tucker
*Assistant Examiner* — Brian R Slawski
(74) *Attorney, Agent, or Firm* — Fishman Stewart Yamaguchi PLLC

(57) ABSTRACT

Exemplary appliques and methods of making the same are disclosed. An exemplary applique may include an adhesive layer having a first contour, and at least one fabric layer defining a second contour. The first contour may be inset from the second contour, with the second contour defining an outer perimeter of the applique. Exemplary appliques may further include a stitching securing the fabric layer to the adhesive layer along a third contour, where the third contour is inset from the first contour. Exemplary methods of making an applique may facilitate creation of a distressed outer edge of the applique.

15 Claims, 2 Drawing Sheets

(56) References Cited

U.S. PATENT DOCUMENTS 5,635,001 A * 6/1997 Mahn, Jr. .............. A41D 27/08
                                              112/475.04

5,817,393 A * 10/1998 Stahl .................. B32B 5/26
                                              112/439
2008/0173222 A1 * 7/2008 Jurnovoy ............. A41D 27/08
                                              112/439

* cited by examiner

PRE-SEWN DISTRESSED APPLIQUE

CROSS-REFERENCE TO RELATED APPLICATIONS

This application claims priority to U.S. Provisional Application Ser. No. 61/699,633, filed on Sep. 11, 2012, the contents of which are hereby expressly incorporated by reference in its entirety.

BACKGROUND

Known methods of creating a distressed applique for applying to a garment include stitching one or more fabric layers directly to the garment. Stitching or embroidering the fabric layer(s) to the garment allows an outer edge of the fabric layer(s) to fray or otherwise become distressed, which is a desirable feature for some applications. However, the process of stitching or embroidering a fabric layer or applique to a garment is time-consuming and may be difficult for novice users.

Accordingly, there is a need for an improved applique and method of making the same that addresses the above problems.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Figure 1:
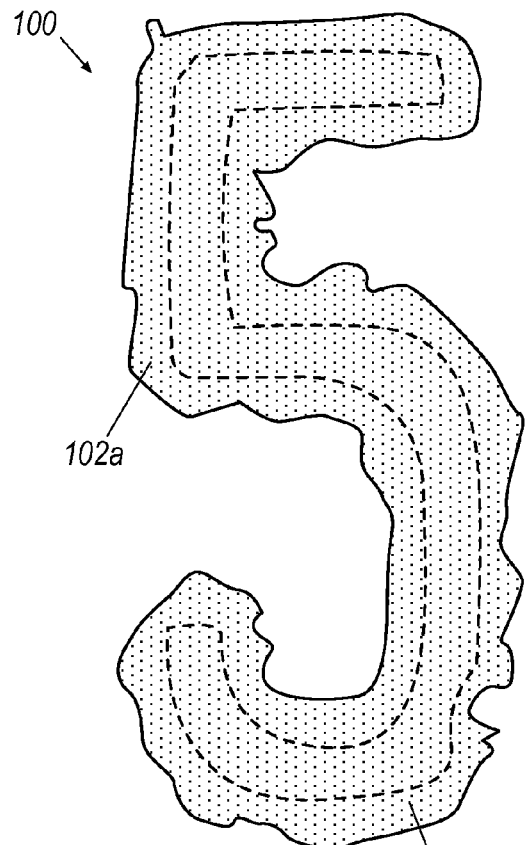
FIG. 1 is a front view of an exemplary distressed applique

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Exemplary methods of making an applique may include scoring an adhesive layer along a first contour that is inset from a second contour, where the second contour defines an outer perimeter of a desired applique. The methods may further include applying at least one layer of fabric on top of the scored adhesive, and stitching the fabric layer to the adhesive layer along a third contour. The third contour may be inset from the first contour. Exemplary methods may further include cutting the fabric layer along the second contour, and removing the finished applique and associated adhesive from remaining portions of the fabric layer.

An exemplary applique may include an adhesive layer having a first contour, and at least one fabric layer defining a second contour. The first contour may be inset from the second contour, with the second contour defining an outer perimeter of the applique. Exemplary appliques may further include a stitching securing the fabric layer to the adhesive layer along a third contour, where the third contour is inset from the first contour. An outer edge of the applique may be frayed or distressed, and creation of the distressed edge may be facilitated by exemplary methods described further below.

Figure 2:
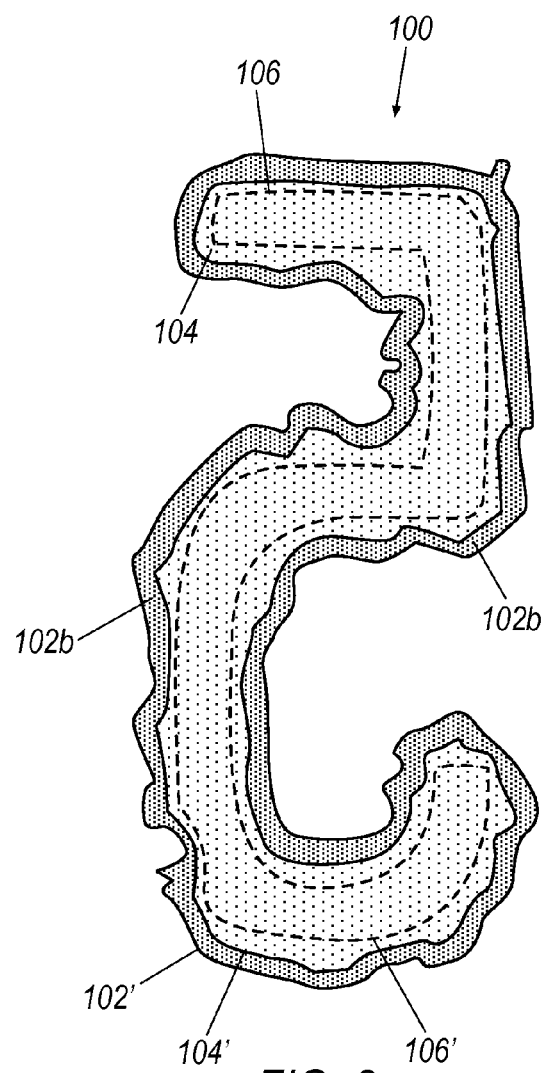
FIG. 2 is a rear view of the exemplary distressed applique of FIG, 1.

Referring to FIGS. 1 and 2, an exemplary applique 100 is illustrated that includes one or more layers of fabric 102 which are sewn together in conjunction with a permanent adhesive 104, and then cut into an appliqué shape, such as a letter or number, in a manner that causes visible distressing of the fabric 102. The adhesive 104 may be heat activated to allow securement to a garment, and once heat applied to a garment gives the appearance of the applique 100 being directly sewn to the garment. The applique 100 may further comprise an embroidery or stitching 106. In contrast to previous approaches to making an applique having a distressed appearance, the applique 100 need not be stitched or embroidered directly to the garment. Rather, the applique 100 may be secured to a garment using the adhesive 104. Nevertheless, a distressed or frayed outer contour of the applique 100 is still created, e.g., as will be described further below.

Accordingly, the applique 100 generally gives an appearance of the appliqué 100 being directly sewn to a garment without requiring the use of embroidery or stitching to secure the applique 100 to the garment. Rather, the applique 100 may be permanently adhered to a garment by way of the adhesive layer 104. As will be described further below, the adhesive layer 104 may be trimmed back from the fabric layer(s) 102 of the applique 100, allowing the fabric layer(s) 102 to fray and distress naturally even after the applique is applied to the garment. Exemplary appliques 100 may be secured to a garment relatively quickly, especially compared with previous approaches to securing a distressed applique that require stitching or embroidering the applique directly to a garment. Moreover, there is no limitation to the number or color of fabrics that may be employed as part of the fabric layer 102, and as such a wide variety of combinations of fabrics and colors may be used in the applique 100.

As best seen in FIG. 2, the adhesive layer 104 is applied to a backside of the fabric layer(s) 102, and is trimmed back from an outer contour 102' of the fabric layer 102. The fabric layer 102 and adhesive layer 104 may be held together by way of the stitching 106. The stitching 106 may be positioned inwardly with respect to the outer contour 102' of the fabric layer 102, as well as an outer contour 104' of the adhesive layer 104. Accordingly, the stitching 106 defines an outer contour 106' that is positioned within the outer contour 104' of the adhesive as well as the outer contour 102' of the fabric layer(s) 102. By positioning the adhesive layer 104 within the outer contour 102' of the fabric layer 102, the fabric layer 102 may be cut such that the outer contour 102' is distressed, or is subsequently allowed to become frayed or distressed, even after application of the applique 100 to a garment (not shown). The positioning of the outer contour 104' of the adhesive 104 within the outer contour 102' of the fabric layer(s) 102 generally allows the fabric layer 102 to be unsupported by the adhesive layer 104, so that the outer edge of the fabric layer(s) 102 may fray or otherwise become distressed.

Figure 3:
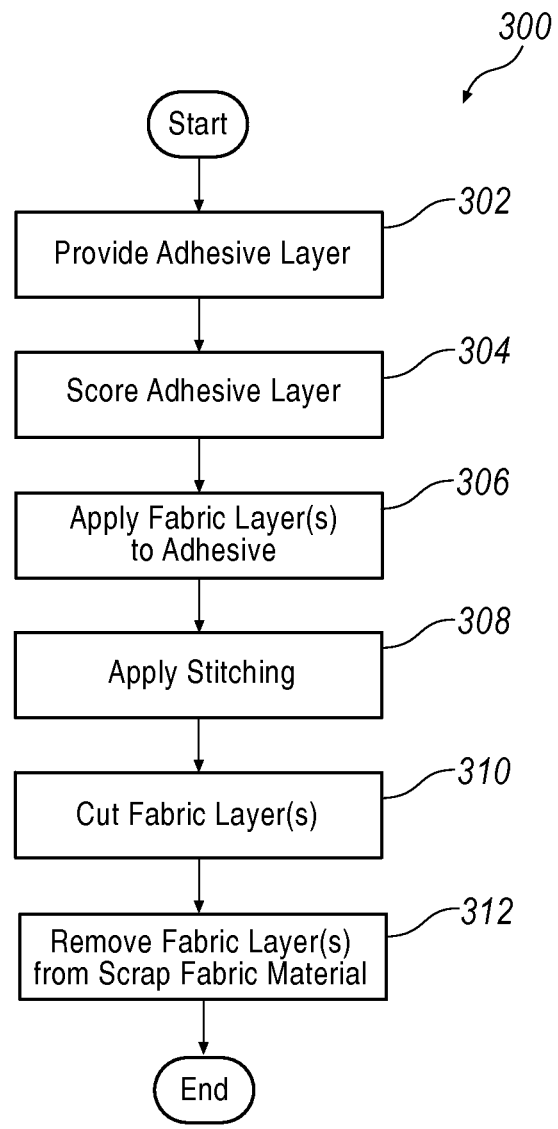
FIG. 3 is a process flow diagram for an exemplary method of making an applique.

Turning now to FIG. 3, an exemplary process 300 of making an applique is disclosed. Process 300 may begin at block 302, where an adhesive layer is provided. In one exemplary approach, an adhesive layer 104 such as a polyester adhesive is clamped in a large frame in a manner that causes it to be generally taut in all directions.

Proceeding to block 304, a cutting device, e.g., a laser, is used to score the adhesive layer 104 with a vector contour corresponding to the outer contour 104' of the adhesive layer 104. The vector contour can be provided from a vector software package such as Corel Draw, merely as one example. This "scoring" contour may be "inset" a distance from and substantially parallel to the "original artwork's" vector contour, i.e., the outer contour 102' of the fabric layer(s) 102, which corresponds to an outer contour of the finished appliqué 100. The resulting scored contour is therefore smaller than the final appliqué 100. Process 300 may then proceed to block 306.

At block 306, one or more layers 102 of a fabric, e.g., a chino twill or t-shirt material, merely as examples, may be laid directly on top of the scored adhesive layer 104, completely covering the scored area of the adhesive 104. In other words, the fabric layers 102 extend beyond the scored contour of the adhesive layer 104, e.g., as illustrated in FIG. 2.

Proceeding to block 308, the fabric layer(s) may be stitched or embroidered to the adhesive layer 104, e.g., with a stitching 106 as illustrated in FIG. 2. In one example, automated embroidery equipment such as Tajima equipment may be employed to sew a different contour that is inset a predetermined distance from and parallel to the "original artwork's" vector contour, i.e., the outer contour of the finished appliqué 100. Moreover, the outer contour 106' of the embroidery or stitching 106 may be inset with respect to the contour 104' of the adhesive 104. Accordingly, the sewing causes the fabric layer(s) 102 to be sewn together along with the scored adhesive layer 104. In examples where multiple layers of fabric are being employed, the sewing operation also joins the multiple layers of fabric together. Process 300 may then proceed to block 310.

At block 310, a cutting device may cut the "original artwork's" vector contour, i.e., the outer contour 102' of the fabric layer(s) 102 and/or the finished appliqué 100, from the fabric layer(s) 102. In one example, the cutting process cuts through the fabric layer(s), but does not cut through the adhesive layer underlying the fabric layer(s).

Proceeding to block 312, the finished appliqué 100 is removed by separating the fabric layer(s) 102 from the remaining "scrap" portions of fabric in a manner that causes the fabric to fray and appear distressed about the outer contour 102' of the fabric layer(s) 102 and/or the appliqué 100. Additionally, since the finished appliqué's fabric layer(s) were sewn to the scored adhesive layer, when the appliqué 100 is removed, the scored adhesive layer 104 separates along the scored contours 104', resulting in the portion of the adhesive 104 defined by the adhesive contour 104' to be removed and attached to the finished appliqué 100. Moreover, since the cutting of the fabric layer(s) 102, e.g., as described above in block 310, does not cut through the adhesive layer 104, the scrap adhesive layer remaining about the outer contour 104' of the adhesive layer is also pulled away from the appliqué 100 as it is removed along the outer contour 102' of the fabric layer 102.

The appliqué 100 may be subsequently secured to a garment, e.g., a shirt or sweatshirt, merely as examples. More specifically, the appliqué 100 may be secured to a garment by way of the adhesive 104, which may be a heat-activated adhesive. Accordingly, the appliqué 100 may have the appearance of being stitched or embroidered to the garment, while not requiring the appliqué 100 to be stitched or embroidered directly to the garment itself. Process 300 may then terminate.

In some exemplary approaches, the exemplary methods described herein may employ a computer or a computer readable storage medium implementing the various methods and processes described herein, e.g., process 400. In general, computing systems and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

The invention claimed is:

1. A method of making an applique, comprising:
   scoring an adhesive layer along a first contour that is inset from a second contour, the second contour defining an outer perimeter of a desired applique;
   applying at least one layer of fabric on top of the scored adhesive;
   stitching the fabric layer to the adhesive layer along a third contour, the third contour inset from the first contour;
   cutting the fabric layer along the second contour; and
   removing the finished applique and associated adhesive from remaining portions of the fabric layer.

2. The method of claim 1, wherein the first contour is substantially parallel to the second contour about the outer perimeter.

3. The method of claim 1, further comprising fraying the fabric layer along the second contour.

4. The method of claim 1, wherein the adhesive layer remains uncut after the cutting of the fabric layer along the second contour.

5. The method of claim 1, wherein cutting the fabric layer along the second contour includes cutting through the fabric layer to a depth corresponding to a maximum depth of the fabric layer.

6. The method of claim 1, further comprising securing the applique to a garment.

7. The method of claim 1, wherein the adhesive is configured to secure the applique to a garment by application of heat.

8. The method of claim 1, wherein the at least one fabric layer includes at least two fabric layers.

9. A method of making an applique, comprising:
   scoring an adhesive layer along a first contour that is inset from a second contour, the second contour defining an outer perimeter of a desired applique;
   applying at least one layer of fabric on top of the scored adhesive;
   stitching the fabric layer to the adhesive layer along a third contour, the third contour inset from the first contour;
   cutting the fabric layer along the second contour, thereby fraying the fabric layer along the second contour; and
   removing the finished applique and associated adhesive from remaining portions of the fabric layer.

10. The method of claim 9, wherein the first contour is substantially parallel to the second contour about the outer perimeter.

11. The method of claim 9, wherein the adhesive layer remains uncut after the cutting of the fabric layer along the second contour.

12. The method of claim 9, wherein cutting the fabric layer along the second contour includes cutting through the fabric layer to a depth corresponding to a maximum depth of the fabric layer.

13. The method of claim 9, further comprising securing the applique to a garment.

14. The method of claim 9, wherein the adhesive is configured to secure the applique to a garment by application of heat.

15. The method of claim 9, wherein the at least one fabric layer includes at least two fabric layers.

* * * * *